(12) United States Patent
Matsuyama et al.

(10) Patent No.: US 10,763,499 B2
(45) Date of Patent: Sep. 1, 2020

(54) CATHODE ACTIVE MATERIAL FOR ALL-SOLID-STATE LITHIUM SECONDARY BATTERY

(71) Applicant: Mitsui Mining & Smelting Co., Ltd., Tokyo (JP)

(72) Inventors: Toshikazu Matsuyama, Ageo (JP); Tetsuya Mitsumoto, Takehara (JP); Hitohiko Ide, Ageo (JP); Daisuke Washida, Ageo (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 26 days.

(21) Appl. No.: 16/317,043

(22) PCT Filed: Jul. 12, 2017

(86) PCT No.: PCT/JP2017/025371
§ 371 (c)(1),
(2) Date: Jan. 11, 2019

(87) PCT Pub. No.: WO2018/012522
PCT Pub. Date: Jan. 18, 2018

(65) Prior Publication Data
US 2019/0260018 A1    Aug. 22, 2019

(30) Foreign Application Priority Data

Jul. 14, 2016  (JP) ................................. 2016-139645
Feb. 8, 2017   (WO) .................. PCT/JP2017/004625

(51) Int. Cl.
*H01M 4/36* (2006.01)
*H01M 4/485* (2010.01)
(Continued)

(52) U.S. Cl.
CPC ............. *H01M 4/366* (2013.01); *H01M 4/36* (2013.01); *H01M 4/485* (2013.01); *H01M 4/505* (2013.01);
(Continued)

(58) Field of Classification Search
CPC .. H01M 4/366; H01M 10/0525; H01M 4/525; H01M 4/505; H01M 4/485
See application file for complete search history.

(56) References Cited

U.S. PATENT DOCUMENTS 7,993,782 B2   8/2011  Takada et al.
9,214,674 B2  12/2015  Yoshida
(Continued)

FOREIGN PATENT DOCUMENTS

JP   20100097845 A    4/2010
JP    2010225309 A   10/2010
(Continued)

OTHER PUBLICATIONS

Kong Ji-Zhou et al: "Li-ion-conductive Li2TiO3-coated Li[Li0.2Mn0.51Ni0.19Co0.1]O2 for high-performance cathode, material in lithium-ion battery", Journal of Solid State Electrochemistry, Springer, vol. 20, No. 5, Feb. 16, 2016, pp. 1435-1443.
(Continued)

*Primary Examiner* — Stewart A Fraser
(74) *Attorney, Agent, or Firm* — The Webb Law Firm

(57) ABSTRACT

Provided is a novel positive electrode active material capable of suppressing resistance and improving rate characteristics and cycle characteristics while enhancing lithium ionic conductivity, wherein the surface of particles composed of a spinel-type composite oxide containing Li, Mn, O, and two or more other elements is coated with a lithium ion conductive oxide such as $LiNbO_3$. Proposed is a positive electrode active material for an all-solid-type lithium sec-
(Continued)

ondary battery, wherein the surface of present core particles composed of a spinel-type composite oxide containing Li, Mn, O, and two or more other elements is coated with an amorphous compound containing Li, A (A represents one or more elements selected from the group consisting of Ti, Zr, Ta, Nb, and Al), and O; and the molar ratio (Li/A) of Li relative to the A element in the surface, as obtained by XPS, is 1.0 to 3.5.

13 Claims, 2 Drawing Sheets

(51) Int. Cl.
  *H01M 4/505* (2010.01)
  *H01M 4/525* (2010.01)
  *H01M 10/0525* (2010.01)
  *H01M 10/052* (2010.01)
  *H01M 10/0562* (2010.01)
  *H01M 4/02* (2006.01)

(52) U.S. Cl.
  CPC ......... *H01M 4/525* (2013.01); *H01M 10/052* (2013.01); *H01M 10/0525* (2013.01); *H01M 10/0562* (2013.01); *H01M 2004/028* (2013.01); *Y02E 60/122* (2013.01); *Y02T 10/7011* (2013.01)

(56) References Cited

U.S. PATENT DOCUMENTS

| | | | |
|---|---|---|---|
| 9,240,595 | B2 | 1/2016 | Kagel et al. |
| 10,186,706 | B2 | 1/2019 | Kagei et al. |
| 2002/0182502 | A1 | 12/2002 | Park et al. |
| 2009/0081554 | A1 | 3/2009 | Takada et al. |
| 2013/0126802 | A1 | 5/2013 | Wu et al. |
| 2014/0087270 | A1 | 3/2014 | Yoshida |
| 2014/0252268 | A1 | 9/2014 | Kagei et al. |
| 2015/0270537 | A1 | 9/2015 | Kato et al. |
| 2015/0270539 | A1 | 9/2015 | Yoshida |
| 2016/0111716 | A1 | 4/2016 | Kagei et al. |
| 2016/0204424 | A1* | 7/2016 | Sawai ............... B60L 50/64 429/332 |

FOREIGN PATENT DOCUMENTS

| | | |
|---|---|---|
| JP | 2011090877 A | 5/2011 |
| JP | 2012-529752 A | 11/2012 |
| JP | 2014049310 A | 3/2014 |
| JP | 2014130851 A | 7/2014 |
| JP | 2015-053236 A | 3/2015 |
| JP | 2015-103321 A | 6/2015 |
| JP | 2015-179616 A | 10/2015 |
| JP | 2015-195176 A | 11/2015 |
| WO | 2007/004590 A1 | 1/2007 |
| WO | 2012160698 A1 | 11/2012 |
| WO | 2014/185547 A1 | 11/2014 |

OTHER PUBLICATIONS

Jun Lu et al: "Nanoscale Coating of LiMO2 (M=Ni, Co, Mn) Nanobelts with Li+-Conductive Li2TiO3: Toward Better Rate Capabilities for Li-Ion Batteries", Journal of the American Chemical Society, vol. 135, No. 5, Feb. 6, 2013, pp. 1649-1652.

Narumi Ohta et al., LiNbO3-coated LiCoO2 as cathode material for all solid-state lithium secondary batteries, Electrochemistry Communications, 2007, pp. 1486-1490, vol. 9, Elsevier B.V.

* cited by examiner

[FIG. 1]
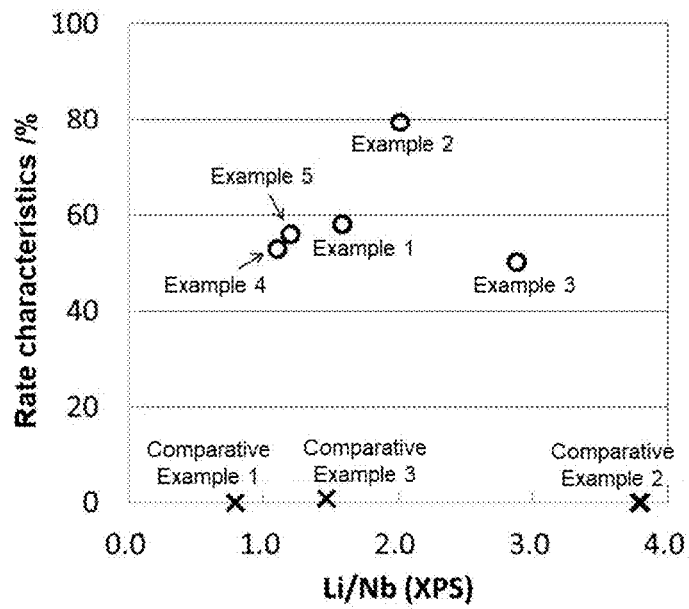
[FIG. 2]
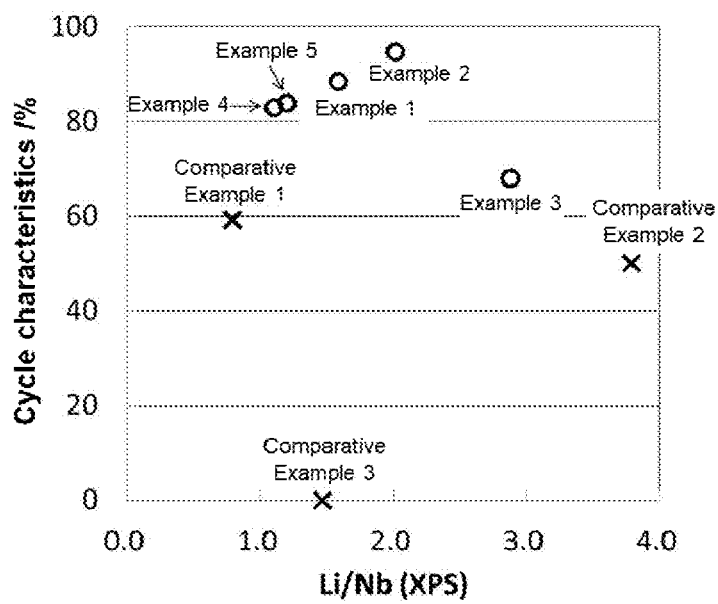

[FIG. 3]
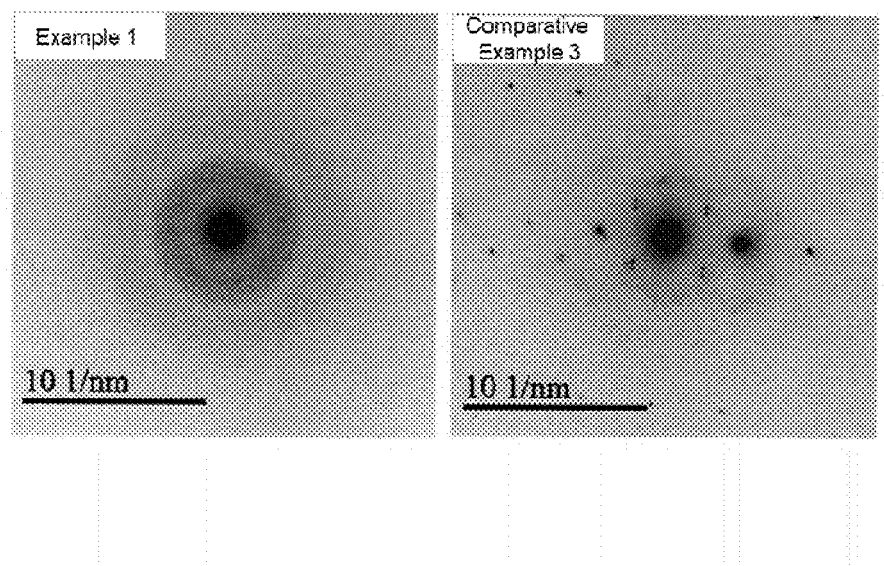

CATHODE ACTIVE MATERIAL FOR ALL-SOLID-STATE LITHIUM SECONDARY BATTERY

CROSS-REFERENCE TO THE RELATED APPLICATIONS

This application is the United States national phase of International Application No. PCT/JP2017/025371 filed Jul. 12, 2017, and claims priority to Japanese Patent Application No. 2016-139645 filed Jul. 14, 2016 and International Application No. PCT/JP2017/004625 filed Feb. 8, 2017, the disclosures of which are hereby incorporated in their entirety by reference.

TECHNICAL FIELD

The present invention relates to a positive electrode active material that can be suitably used for a lithium secondary battery using a solid electrolyte (referred to as "all-solid-type lithium secondary battery").

BACKGROUND ART

A lithium secondary battery is a secondary battery having a structure in which lithium dissolves out as ions from a positive electrode at the time of charging and moves to a negative electrode to be stored therein, and conversely, the lithium ions return to the positive electrode from the negative electrode at the time of discharging. Since such a lithium secondary battery has features such as high energy density and a long life, it is widely used as a power supply for electric appliances such as a video camera, portable electronic devices such as a laptop computer and a mobile telephone, electric tools such as a power tool, and the like. Recently, the lithium secondary battery is also applied to a large-sized battery that is mounted in an electric vehicle (EV), a hybrid electric vehicle (HEV), and the like.

A lithium secondary battery of this kind is generally constituted of a positive electrode, a negative electrode, and an ion conducting layer inserted between both of the electrodes. As the ion conducting layer, a separator formed from a porous film of polyethylene, polypropylene, or the like, which is filled with a non-aqueous electrolyte solution, is generally used.

However, since a flammable organic electrolyte solution is used as described above, it is required to improve a structure and materials for preventing volatilization or leakage, and also, it is required to install a safety device for suppressing an increase in temperature at the time of a short circuit and to improve a structure and materials for preventing a short circuit.

In contrast, an all-solid-type lithium secondary battery does not require a flammable organic electrolyte solution. Therefore, simplification of safety devices can be attempted, and the battery can be excellent in terms of production cost or productivity. Also, the battery has a feature that the solid electrolyte can be laminated in series in a cell, and thus voltage increase can be promoted. Furthermore, in a solid electrolyte of this kind, since nothing but an ion moves, side reactions caused by movement of anions do not occur, and it is expected that this leads to improvement of safety and durability.

A solid electrolyte to be used in the all-solid-type lithium secondary battery is required to have high ionic conductivity as far as possible and to be stable chemically and electrochemically. For example, lithium halide, lithium nitride, lithium oxoate, derivatives of these compounds, and the like are known as candidate materials for the solid electrolyte.

However, a solid electrolyte and a positive electrode active material to be used in the all-solid-type lithium secondary battery have a problem in that a high resistant layer is formed by reacting each other, and thus the interfacial resistance becomes large. Therefore, proposals for improving the interface have been disclosed.

For example, in regard to a positive electrode active material that can be used for an all-solid-type lithium secondary battery, International Patent Publication No. WO 2007/004590 discloses that a $LiNbO_3$ coating layer is formed on the surface of a positive electrode active material, and, by using the positive electrode active material, the output characteristics of the all-solid-type battery can be improved by interposing a lithium ion-conducting oxide layer between the interfaces of the positive electrode active material and a solid electrolyte.

Further, Japanese Patent Laid-Open No. 2015-179616 discloses an active material powder that has a coating layer containing $LiNbO_3$ on the surface of the active material powder capable of absorbing and desorbing lithium ions at a potential of 4.5 or more based on Li.

SUMMARY OF THE INVENTION

As disclosed in the above Japanese Patent Laid-Open No. 2015-179616, it has been confirmed that when a lithium ion-conducting oxide layer such as $LiNbO_3$ is formed on the surface of a positive electrode active material (referred to as "5 V-class positive electrode active material") capable of absorbing and desorbing lithium ions at a potential of 4.5 or more based on Li, and interposed between the interfaces of the 5 V-class positive electrode active material and a solid electrolyte, the battery capacity can be further increased.

However, when considering a spinel-type composite oxide containing Li, Mn, O, and two or more other elements among the 5 V-class positive electrode active materials, it is found that resistance cannot be suppressed while enhancing ionic conductivity only by forming a lithium ion-conducting oxide layer such as $LiNbO_3$, and thus rate characteristics and cycle characteristics cannot be improved. It can be assumed that this is because the interfacial resistance between the active material and the solid electrolyte is remarkably increased when using the 5 V-class positive electrode active material.

Thus, the present invention is to provide a novel positive electrode active material capable of suppressing resistance and improving rate characteristics and cycle characteristics while enhancing ionic conductivity, wherein the surface of particles composed of a spinel-type composite oxide containing Li, Mn, O, and two or more other elements is coated with a lithium ion conductive oxide such as $LiNbO_3$.

SUMMARY OF THE INVENTION

The present invention proposes a positive electrode active material for an all-solid-type lithium secondary battery to be used for an all-solid-type lithium secondary battery, wherein the surface of particles (referred to as "core particles") composed of a spinel-type composite oxide containing Li, Mn, O, and two or more other elements is coated with an amorphous compound containing Li, A (A represents one or more elements selected from the group consisting of Ti, Zr, Ta, Nb, and Al), and O; and the molar ratio (Li/A) of Li relative to the A element in the surface, as obtained by X-ray photoelectron spectroscopy (XPS), is 1.0 to 3.5.

As for the positive electrode active material for an all-solid-type lithium secondary battery proposed by the present invention, in a structure in which the surface of particles (present core particles) composed of a spinel-type composite oxide containing Li, Mn, O, and two or more other elements is coated with an amorphous compound containing Li, an A element, and O, both the improvement of lithium ionic conductivity and the resistance suppression can be achieved by controlling a ratio between Li and the A element in the surface of the positive electrode active material within a predetermined range, and thus rate characteristics and cycle characteristics can be effectively improved.

BRIEF DESCRIPTION OF DRAWINGS

FIG. 1 is a graph showing rate characteristics relative to Li/Nb in regard to the samples obtained in Examples and Comparative Examples;

FIG. 2 is a graph showing cycle characteristics relative to Li/Nb in regard to the samples obtained in Examples and Comparative Examples; and FIG. 3 shows an observation of halo patterns obtained by selected area electron diffraction in regard to the samples obtained in Example 1 and Comparative Example 3.

DETAILED DESCRIPTION OF THE INVENTION

Mode(s) for Carrying Out the Invention

Next, the invention will be described based on embodiments. However, the present invention is not limited to the embodiments that will be described below.

<Present Positive Electrode Active Material>

The positive electrode active material according to one example of embodiments of the present invention is a positive electrode active material to be used for an all-solid-type lithium secondary battery using a solid electrolyte, and is a positive electrode active material (referred to as "present positive electrode active material") comprising a structure in which the surface of particles (referred to as "present core particles") composed of a spinel-type composite oxide containing Li, Mn, O, and two or more other elements is coated with an amorphous compound (referred to as "present amorphous compound") containing Li, an A element (A represents one or more elements selected from the group consisting of Ti, Zr, Ta, Nb, and Al), and O.

(Present Core Particles)

The present core particles are particles composed of a spinel-type composite oxide containing Li, Mn, O, and two or more other elements.

Incidentally, when particles composed of a layered lithium nickel manganese cobalt composite oxide are used instead of the present core particles, it is confirmed that the rate characteristics and the cycle characteristics tend to deteriorate as compared with a case using the present core particles.

At least one element from the above "two or more other elements" may be one or more elements selected from the group consisting of Ni, Co, and Fe (referred to as "M1 element"), and another element may be one or more elements selected from the group consisting of Mg, Ti, Al, Ba, Cr, W, Mo, Y, Zr, and Nb (referred to as "M2 element").

A preferred composition example of the present core particles may be a spinel-type composite oxide having a crystal structure in which a part of the Mn sites in $LiMn_2O_{4-\delta}$ are substituted with Li, the M1 element, and the other M2 element.

The M1 element is a substitution element mainly contributing in exhibiting a high operating electric potential, and examples thereof may include Ni, Co, Fe, and the like. The M1 element may contain at least one of these elements, and particularly preferably contain at least one element of Ni and Co.

On the other hand, the M2 element is a substitution element contributing in stabilizing the crystal structure and in enhancing the lithium ionic conductivity, and examples thereof may include Mg, Ti, Al, Ba, Cr, W, Mo, Y, Zr, Nb, and the like. The M2 element may contain at least one element of Mg, Ti, Al, Ba, Cr, W, Mo, Y, Zr, and Nb. The M2 element particularly preferably contain at least one element of Ti, Al, Zr, and Nb from the viewpoint of stabilizing the crystal structure, and particularly preferably contain at least one element of Mg, Ba, Cr, W, Mo, and Y from the viewpoint of enhancing the lithium ionic conductivity.

A preferred example of the present core particles may be a spinel-type composite oxide represented by a formula (1): $Li[Li_aMn_{2-a-b-c}M1_bM2_c]O_{4-\delta}$. M1 element and M2 element in the formula (1) are as described above.

In the above formula (1), the parameter "a" represents a substitution amount (mole) of Li in the Mn site, and may be 0.00 to 0.20. Among others, the parameter "a" is preferably 0.01 or more or 0.10 or less, and more preferably 0.02 or more or 0.08 or less.

The parameter "b" represents a substitution amount (mole) of M1 element in the Mn site, and may be 0.20 to 1.20. Among others, the parameter "b" is preferably 0.30 or more or 1.10 or less, and more preferably 0.35 or more or 1.05 or less.

The parameter "c" represents a substitution amount (mole) of M2 element in the Mn site, and may be 0.001 to 0.400. Among others, the parameter "c" is preferably 0.050 or more or 0.400 or less, and more preferably 0.100 or more or 0.300 or less.

Meanwhile, the term "4-δ" in the above formula (1) implies that the present core particles may also contain oxygen deficiency. From the viewpoint of maintaining the lithium ionic conductivity, the parameter δ is preferably 0.1 or less, and among others, it is more preferably 0.05 or less.

The present core particles may contain components other than the spinel-type composite oxide, for example, other components other than Li, Mn, the M1 element, the M2 element, and O in the formula (1).

In particular, the content of the other elements is preferably 0.5 wt % or less since it may be considered that the other elements would hardly affect the performance of the present core particles.

The present core particles may contain B (boron). As described later, the present core particles have an effect of enhancing the reactivity in calcination when containing a boron compound, and thus the boron compound may be added as necessary. In so doing, B may be contained in the spinel-type composite oxide, or B may form a different composite oxide to be contained therein. Examples of the different composite oxide may include $Ni_5MnO_4(BO_3)_2$.

The lattice constant of the spinel-type composite oxide is preferably 0.8000 to 0.8300 nm from the viewpoint of stabilizing the spinel structure, and among others, it is more preferably 0.8100 nm or more or 0.8250 nm or less, and even more preferably 0.8150 nm or more or 0.8200 nm or less.

Meanwhile, whether or not the composite oxide constituting the present core particles is a spinel-type composite oxide can be confirmed according to whether or not, for example, the range of Rwp or S which represents the degree of coincidence of an observed intensity with a calculated intensity is Rwp<10 or S<2.5 when fitting to a crystal structure model of a cubic crystal of a space group Fd-3m (Origin Choice 2).

(Present Amorphous Compound)

In the present positive electrode active material comprising a structure in which the surface of the present core particles is coated with the present amorphous compound, both the improvement of lithium ionic conductivity and the resistance suppression can be achieved by controlling a ratio between Li and the A element in the surface of the present positive electrode active material within a predetermined range, and thus the rate characteristics and the cycle characteristics can be effectively improved.

In so doing, the present amorphous compound may be present as particles, may be present as aggregated particles formed by aggregating particles, or may be present by forming a layer, on the surface of the present core particles.

Here, the "present by forming a layer" means a state in which the present amorphous compound is present with a thickness.

In addition, when almost the whole surface of the present core particles is coated with the present amorphous compound, there may be areas where the present amorphous compound is not present on a part of area or several partial areas of the surface of the present core particles.

Here, whether the surface of the present core particles is coated with the present amorphous compound can be confirmed by observing the surface of the present core particles by using, for example, an electron microscope.

Further, the thickness of the present amorphous compound to be coated on the surface of the present core particles may not be uniform.

The present amorphous compound is important to be amorphous. By being amorphous, the present amorphous compound is present as a buffer layer between the electrodes and the solid electrolyte, and thus the reaction resistance can be reduced.

Whether or not a compound to be coated on the surface of the present core particles is crystalline or amorphous can be judged by confirming whether a halo pattern can be obtained by selected area electron diffraction. Here, the halo pattern means a low-angle broad diffraction pattern having no clear diffraction peak.

The present amorphous compound preferably contains Li, the A element (A represents one or more elements selected from the group consisting of Ti, Zr, Ta, Nb, and Al), and O.

When the A element is at least one element of Ta and Nb, the composition of the present amorphous compound can be represented by, for example, $Li_xAO_y$. Typically, $LiAO_3$, that is, the composition when x=1 and y=3 can be assumed. However, because the compound is an amorphous compound, the parameters x and y in the formula can take arbitrary values in ranges according to valences of the elements. Among others, a composition (1<x) containing Li in excess of 1 mole relative to 1 mole of the A element is more preferred.

Examples of the method for satisfying 1<x in the amorphous compound of $Li_xAO_y$ may include a method in which the blending amount of the lithium raw material relative to the A element raw material is adjusted such that the amount of Li becomes excessive as compared with a composition assumed to be generated of a compound containing lithium, for example, a stoichiometric composition ratio of $LiAO_3$.

However, when an excessive amount of Li is merely added, lithium carbonate caused by the excessive amount of Li is generated on the surface of the present positive electrode active material. Due to this, it tends to adversely deteriorate the rate characteristics and the cycle characteristics. Thus, by taking this point, that is, the generation of lithium carbonate into consideration, it is preferable to adjust the blending amount of the A element raw material and the blending amount of the lithium raw material such that the amorphous compound has a predetermined composition.

<Present Positive Electrode Active Material>

The present positive electrode active material preferably has the following features.

(Surface Composition)

In the present positive electrode active material comprising a structure in which the surface of the present core particles is coated with the present amorphous compound, both the improvement of lithium ionic conductivity and the resistance suppression can be achieved by controlling a ratio between Li and the A element in the surface of the present positive electrode active material within a predetermined range, and thus the rate characteristics and the cycle characteristics can be effectively improved.

That is, the molar ratio (Li/A) of Li content relative to the A element content in the surface of the present positive electrode active material (particles), as obtained by X-ray photoelectron spectroscopy (XPS), is preferably 1.0 to 3.5. Among others, it is more preferably 1.1 or more, even more preferably 1.2 or more or 3.5 or less, still more preferably 1.3 or more or 3.4 or less, furthermore preferably 1.5 or more or 3.2 or less, and particularly preferably 1.7 or more or 2.3 or less.

Here, the molar ratio (Li/A) is a value also containing Li caused by lithium carbonate.

In order to control the ratio between Li and the A element in the surface of the present positive electrode active material within the range, it is preferable to adjust the blending amount of the A element raw material and the blending amount of the lithium raw material such that the molar ratio (Li/A) falls within the range while taking the Li amount caused by lithium carbonate to be generated on the surface of the present positive electrode active material into account, as described above. By doing so, the rate characteristics and the cycle characteristics can be remarkably improved.

(Amount of Lithium Carbonate)

Lithium carbonate may be present on the surface of the present positive electrode active material in addition to the present amorphous compound. In so doing, when the amount of lithium carbonate present on the surface of the positive electrode active material is large, the lithium ionic conductivity is decreased. Thus, the content of lithium carbonate is preferably less than 2.5 wt % relative to the total amount of the present positive electrode active material, and among others, it is more preferably less than 1.5 wt %, and even more preferably less than 0.5 wt %.

In order to reduce the amount of lithium carbonate present on the surface of the present positive electrode active material, for example, calcining under an atmosphere not containing carbon dioxide, such as a nitrogen atmosphere or an oxygen atmosphere, is preferred, and hydrolyzing while irradiating ultrasonic waves is further preferred.

(D50)

The D50 of the present positive electrode active material according to the volume-based particle size distribution which can be obtained via measurements by a laser diffraction and scattering-type particle size distribution measurement method, is preferably 0.5 to 30 μm from the viewpoint of maintaining contact with a solid electrolyte, and among others, it is more preferably 1.0 μm or more or 20 μm or less, and more preferably 2.0 μm or more or 10 μm or less.

(Average Primary Particle Size)

The average primary particle size of the present positive electrode active material is preferably more than 0.5 μm.

When the average primary particle size of the present positive electrode active material is larger than 0.5 μm, it is well balanced with the size of the solid electrolyte, and thus a dispersion path for lithium ions can be secured. Contrarily, when the average primary particle size of the present positive electrode active material is too large, reaction resistance with the solid electrolyte may increase.

Thus, the average primary particle size of the present positive electrode active material is preferably more than 0.5 μm, and among others, it is more preferably 0.7 μm or more or 15 μm or less, and even more preferably 1.0 μm or more or 10 μm or less.

In order to set the average primary particle size of the present positive electrode active material to more than 0.5 μm, it is preferable to produce the present core particles by calcining at a high temperature of 800° C. or more, or adding a material which enhances the reactivity in calcination such as a boron compound or a fluorine compound, followed by calcining. However, the production method is not limited to this method.

Meanwhile, the term "primary particles" as used in the present invention means particles of the smallest unit that are surrounded by grain boundaries when observed with a SEM (scanning electron microscope, for example, a magnification of 500 to 5,000 times).

Further, the average diameter of primary particles can be determined by observing with a SEM (scanning electron microscope, for example, a magnification of 500 to 5,000 times), selecting arbitrary 50 primary particles, calculating the average particle diameter of the selected primary particles using an image analysis software, and averaging the primary particle diameters of the 50 particles.

On the other hand, the term "secondary particles" as used in the present invention means particles in which plural primary particles are aggregated so as to share portions of the outer peripheries (grain boundaries) of the respective particles, and are segregated from other particles.

The D50 according to the volume-based particle size distribution which can be obtained via measurements by a laser diffraction and scattering-type particle size distribution measurement method, has a meaning as a substitute value of the average diameter of particles including these primary particles and secondary particles. The form of the present core particles may be primary particles, or may be secondary particles.

(Specific Surface Area)

The specific surface area (SSA) of the present positive electrode active material is preferably 0.1 to 10 $m^2/g$.

Among others, it is more preferably 5.0 $m^2/g$ or less, and even more preferably 1.5 $m^2/g$ or less.

<Method of Producing Present Positive Electrode Active Material>

The present positive electrode active material can be produced in such a manner that, for example, the present core particle powder composed of a spinel-type composite oxide containing Li, Mn, O, and two or more other elements is prepared, the present core particles are added to a mixed solution obtained by dissolving the lithium raw material and the A element raw material in a solvent, and the resultant product is hydrolyzed and then calcined under a predetermined condition. In so doing, performing the hydrolysis while irradiating ultrasonic waves is important in producing the present positive electrode active material.

However, it is not limited to such a production method. The present positive electrode active material can also be produced by, for example, a tumbling fluidized coating method (sol-gel method), a mechano-fusion method, a CVD method, a PVD method, or the like by adjusting the conditions.

(Method of Producing Present Core Particle Powder)

An example of the production method of the present core particle powder may be a method in which the present core particle powder can be obtained by mixing raw materials ("mixing step"), calcining ("calcination step"), and as necessary, subjecting to a heat treatment ("heat treatment step"), pulverizing ("pulverization step"), subjecting to a heat treatment under an oxygen-containing atmosphere to be performed after the pulverization ("post-pulverizing heat treatment step in an oxygen-containing atmosphere"), and further classifying as necessary.

In addition, it is preferable that washing ("washing step") is further performed in any step. At this time, the washing step can be inserted in an appropriate order. For example, the washing step can be inserted before and after the mixing step of raw materials, before and after the calcination step, before and after the heat treatment step, before and after the pulverization step, or before and after the post-pulverizing heat treatment step in an oxygen-containing atmosphere. The washing step can also be performed more than once.

Also, other steps can be added in addition to the above steps. For example, a wet pulverization step, a granulation step, a drying step, a crushing and classification step, and other steps can be further added.

(Raw Material)

Examples of the lithium raw material may include lithium hydroxide and its hydroxide, lithium carbonate, lithium nitrate, lithium oxide, other fatty acid lithium, lithium halide, and the like. Among others, hydroxide salt, carbonate, and nitrate of lithium are preferable.

Examples of the manganese raw material may include manganese carbonate, manganese nitrate, manganese chloride, manganese dioxide, dimanganese trioxide, trimanganese tetroxide, and the like. Among others, manganese carbonate and manganese dioxide are preferable. Among others, electrolytic manganese dioxide that is obtained by an electrolytic method is more preferable.

Examples of the M1 element raw material and the M2 element raw material may include carbonate, nitrate, chloride, oxyhydroxide salt, and hydroxide of M1 or M2 element.

In addition, a boron compound can be added to the raw material.

The boron compound may be a compound containing boron (B), and for example, it is preferable to use boric acid or a lithium borate. As the lithium borate, various forms thereof, for example, lithium metaborate, lithium tetraborate, lithium pentaborate, and lithium perborate can be used.

Mixing such a boron compound may generate a composite oxide containing Ni, Mn, and B, such as $Ni_5MnO_4(BO_3)_2$, in addition to the spinel-type composite oxide.

(Mixing Step)

The method of mixing the raw materials is not especially limited as long as the raw materials can be uniformly mixed. For example, the respective raw materials may be added simultaneously or in an appropriate order, and may be stirred and mixed in a wet mode or a dry mode, using a known mixing machine such as a mixer, to serve as a raw material mixed powder. When an element that is not easily substitutable, for example, aluminum, is added, it is preferable to employ wet mixing.

As the dry mixing, for example, a mixing method using a precision mixing machine which rotates the raw material mixed powder at a high speed can be exemplified.

On the other hand, as the wet mixing, a method of adding the raw material mixed powder to a liquid medium such as water or a dispersant, and mixing to obtain a slurry, can be cited.

(Pulverization Step)

In the wet pulverization, the raw materials may be pulverized by introducing into a liquid medium such as water.

The wet pulverization may be performed before mixing the raw materials, or may also be performed after mixing the raw materials.

In the case of performing the wet pulverization after mixing the raw materials, the raw material mixed powder is added to a liquid medium such as water or a dispersant, and is wet mixed to obtain a slurry as described above, and then the obtained slurry may be pulverized by using a wet-type pulverizer. At this time, it is particularly preferable to pulverize the slurry to submicron order. By granulating and calcining the obtained slurry after pulverizing to submicron order, the uniformity of the respective particles before the calcination reaction can be increased, and the reactivity can be enhanced.

Meanwhile, in the case of performing the wet pulverization before mixing the raw materials, the respective raw materials may be respectively wet pulverized, and then mixed. Thereafter, the resultant mixture may be further wet pulverized as necessary.

In the case of pulverizing the respective raw materials respectively, in order to enhance the homogeneity at the time of mixing the raw materials, it is preferable that raw materials having a large D max are pulverized and classified in advance before mixing the raw materials, and adjusted such that the maximum particle diameter (D max) becomes 10 μm or less, more preferably 5 μm or less, and even more preferably 4 μm or less.

(Granulation Step)

It is preferable that the raw materials mixed as described above may be calcined after being granulated to a predetermined size, if necessary. However, granulation may not be necessarily performed.

The granulation method may be a wet-type method or a dry-type method as long as various raw materials that are pulverized in the previous step are dispersed in granulated particles, and may be an extrusion granulation method, a rolling granulation method, a fluidized bed granulation method, a mixing granulation method, a spray drying granulation method, a pressure molding granulation method, or a flake granulation method using a roll or the like. However, in the case of performing the wet-type granulation, sufficient drying before the calcination is preferred.

(Drying Step)

The drying may be performed by known drying methods such as a spray thermal drying method, a hot-air drying method, a vacuum drying method, and a freeze-drying method, and among others, a spray thermal drying method is preferred. The spray thermal drying is preferably performed by using a thermal spray drying machine (spray dryer). When the granulation is performed by using a thermal spray drying machine, a particle size distribution can be sharper, and a configuration of secondary particles can be prepared so as to include aggregated particles (secondary particles) that are aggregated in a round shape.

(Calcination Step)

As for the calcination, it is preferable to calcine under an atmosphere in which an oxygen partial pressure is 0.015 to 0.15 MPa, for example, under an air atmosphere.

When the oxygen partial pressure is 0.15 MPa or less, the crystal growth can be easily promoted, and thus the crystallite size can be easily enlarged. Further, as described later, in order to promote the crystal growth by calcination, the oxygen partial pressure of the atmosphere is preferably low. However, when the oxygen partial pressure at the time of calcining is too low, oxygen deficiency in the spinel structure is increased, and a strain of the crystal lattice is hardly recovered even by the heat treatment. Therefore, it is preferable to calcine at an oxygen partial pressure of 0.015 MPa or more.

From such a viewpoint, the oxygen partial pressure at the time of calcining is more preferably 0.015 to 0.13 MPa, even more preferably 0.015 to 0.12 MPa, still more preferably less than 0.08 MPa, and particularly preferably less than 0.061 MPa.

As for the calcination temperature, since a specific surface area can be lowered by calcining at high temperature, it is preferable to calcine at a temperature of 770° C. or more, more preferably 800° C. or more, and even more preferably 850° C. or more.

However, when the calcination temperature is too high, there is a possibility that oxygen deficiency in the spinel structure is increased, and a strain of the crystal lattice cannot be recovered even by the heat treatment. Therefore, it is preferable to calcine at a temperature of 1,000° C. or less, and more preferably 980° C. or less.

Here, the calcination temperature means a temperature of a calcined product measured by bringing a thermocouple into contact with the calcined product inside a calcination furnace.

The calcination time, that is, a time for maintaining the calcination temperature, may vary with the calcination temperature, but it may be 0.5 to 100 hours.

The kind of the calcination furnace is not particularly limited. The calcination can be performed by using, for example, a rotary kiln, a stationary furnace, or other calcination furnaces.

In the case of coexisting materials which enhance the reactivity in calcination such as a boron compound, a specific surface area can be lowered even at low temperature. In such a case, it is preferable to calcine at a calcination temperature of more than 770° C., more preferably 800° C. or more, and even more preferably 850° C. or more. However, when the calcination temperature is too high, there is a possibility that oxygen deficiency in the spinel structure of the present core particle powder is increased, and a strain of the crystal lattice cannot be recovered even by the heat treatment. Therefore, it is preferable to calcine at a temperature of 980° C. or less, and more preferably 960° C. or less.

Meanwhile, when the materials which enhance the reactivity at the time of calcining as described above are not coexisted, it is preferable to calcine at a temperature of more than 800° C., more preferably 840° C. or more, and even more preferably 880° C. or more. However, when the calcination temperature is too high, there is a possibility that oxygen deficiency in the spinel structure of the present core particle powder is increased, and a strain of the crystal lattice cannot be recovered even by the heat treatment. Therefore, it is preferable to calcine at a temperature of 1,000° C. or less, and more preferably 980° C. or less. After the calcination, it is preferable to perform a crushing as necessary. By crushing a sintered mass or the like after calcination, oxygen can be easily incorporated into powder, and then it is possible to suppress oxygen deficiency and to decrease a strain, in a heat treatment step that will be described later.

(Heat Treatment Step)

The heat treatment is preferably performed under an air atmosphere, an atmosphere whose oxygen partial pressure is adjusted, or other atmospheres, in an environment of 500 to 800° C., preferably 700° C. or more or 800° C. or less for 0.5 to 300 hours so as to easily incorporate oxygen into the crystal structure.

In the heat treatment, the heat treatment atmosphere may be an atmosphere where the overall pressure of the treatment atmosphere is a pressure which is higher than air pressure (0.1 MPa), for example, more than 0.19 MPa, and more preferably 0.20 MPa or more, as necessary.

However, when the overall pressure of the treatment atmosphere is too high, there is a possibility that the production becomes unstable due to a problem on strength of the pressurized furnace. Therefore, from such a viewpoint, the heat treatment is preferably performed at an atmosphere pressure of 1.5 MPa or less, and more preferably 1.0 MPa or less.

By performing the heat treatment in such a pressuring state, oxygen is more easily incorporated, and thus the oxygen deficiency can be further suppressed.

After the heat treatment step, it is preferable to crush the substance as necessary. In so doing, the crushing is preferably performed to an extent that the secondary particles should not be crushed. Then, it is preferable to classify the substance after crushing.

(Washing Step)

An object to be treated that is subjected to the washing step may be, for example, each of the raw materials before mixing of the raw materials, a raw material mixed powder after mixing of the raw materials, a treated object obtained from a calcination step, a treated object obtained from a heat treatment step, a treated powder after heat treating in an oxygen-containing atmosphere, and further a treated powder obtained from pulverization as described later. Two or more kinds of these may be washed.

In the washing step, it is preferable to bring an object to be treated (powder) into contact with a polar solvent, and to wash the powder so as to separate impurities contained in the powder.

For example, the object to be treated (powder) and a polar solvent are mixed and stirred to obtain a slurry, and the slurry thus obtained may be subjected to solid-liquid separation by filtration or the like, so as to eliminate impurities. At this time, the solid-liquid separation may be performed at a subsequent step. Here, the slurry means a state in which the treated powder is dispersed in the polar solvent.

For the polar solvent that is used for washing, water is preferably used.

The water may be tap water, but it is preferable to use ion-exchanged water or pure water that has been passed through a filter or a wet-type magnetic separator.

The pH of water is preferably 4 to 10, and among others, the pH is more preferably 5 or more or 9 or less.

In regard to the liquid temperature at the time of washing, it has been confirmed that the battery characteristics become more satisfactory by appropriately controlling the liquid temperature. From such a viewpoint, the liquid temperature is preferably 5 to 70° C., and among others, it is more preferably 60° C. or less, and even more preferably 45° C. or less. Also, it is particularly preferably 30° C. or less.

The reason why the battery characteristics become more satisfactory when the liquid temperature at the time of washing is low, is that when the liquid temperature is too high, lithium in the spinel-type composite oxide is ion-exchanged with protons in the polar solvent, and lithium is then removed, which affects high temperature characteristics.

As for the amount of the polar solvent that is brought into contact with the object to be treated (powder), the mass ratio of the spinel-type composite oxide relative to the total mass of the polar solvent and the spinel-type composite oxide (also referred to as "slurry concentration") is preferably 10 to 70 wt %, and among others, it is more preferably 20 wt % or more or 60 wt % or less, and even more preferably 30 wt % or more or 50 wt % or less. When the amount of the composite oxide is 10 wt % or more, impurities such as $SO_4$ can be easily eluted, and on the contrary, when the amount of the composite oxide is 70 wt % or less, a washing effect adequate for the amount of the polar solvent can be obtained.

(Pulverization Step)

In the pulverization step, it is preferable to pulverize using an airflow-type pulverizer, a classification mechanism-equipped collision-type pulverizer, for example, a jet mill, a classifying rotor-equipped counter jet mill, or the like. When the pulverization is performed using a jet mill, an aggregation between the primary particles or a part where the degree of the calcination is weak can be pulverized. However, it is not limited to a jet mill. Pulverizers such as a pin mill and a planetary ball mill can also be used.

An example of the jet mill may be a classifying rotor-equipped counter jet mill. The counter jet mill is known as a pulverizer utilizing a collision of compressed gas flow. Raw materials supplied from a raw material hopper to the mill are fluidized by injection air from the nozzle. In so doing, the counter jet mill is placed such that the injection air converges to one point. Thus, the particles accelerated during the jet collide each other, and the particles can be finely pulverized.

The number of revolutions of classifier of the counter jet mil is preferably 7,000 rpm or more, and among others, it is more preferably 8,000 rpm or more or 18,000 rpm or less, and even more preferably 9,000 rpm or more or 18,000 rpm or less.

(Post-Pulverizing Heat Treatment Step in Oxygen-Containing Atmosphere)

After the pulverization step, a heat treatment in an oxygen-containing atmosphere may be performed as necessary (post-pulverizing heat treatment step in oxygen-containing atmosphere).

By performing a heat treatment in an oxygen-containing atmosphere after the pulverization step, oxygen can be incorporated into the structure, and a strain caused by the pulverization can be decreased.

In the post-pulverizing heat treatment step in an oxygen-containing atmosphere, it is preferable to perform a heat treatment in a treatment atmosphere in which an overall pressure in the treatment atmosphere is air pressure or a pressure higher than air pressure, and an oxygen partial pressure in the atmosphere is higher than an oxygen partial pressure in air pressure.

By performing the heat treatment in an oxygen-containing atmosphere as described above, oxygen is incorporated into the structure of the present core particles, and thus oxygen deficiency in the spinel structure is decreased to stabilize the structure. Therefore, even in the case of calcining at high temperature as described above, a plateau region at a high potential side can be expanded to expand a high potential capacity region, and thus improvement of the energy density can be attempted.

Incidentally, the pressure atmosphere which is higher than air pressure includes an atmosphere of the pressure higher than air pressure, in which the inside of a sealed container is heated to increase a temperature of gas in a certain volume, and thus the pressure is increased.

The oxygen partial pressure in the heat treatment to be performed under the pressure atmosphere which is higher than air pressure is preferably, for example, 0.19 MPa or more, and among others, it is more preferably 0.20 MPa or more. However, when the oxygen partial pressure is too high, there is a possibility that the production becomes unstable due to a problem on strength of the pressurized furnace. Therefore, from such a viewpoint, the heat treatment is preferably performed under an oxygen partial pressure of 1.5 MPa or less, and more preferably 1.0 MPa or less.

It is preferable to control a heat treatment temperature in the post-pulverizing heat treatment step in an oxygen-containing atmosphere, that is, a retention temperature to a temperature of higher than 500° C. and lower than 850° C.

When the heat treatment temperature is higher than 500° C., the heat treatment is performed while forcibly supplying oxygen to incorporate oxygen into the crystal structure, and thus a strain in the present core particle can be effectively decreased. From such a viewpoint, the heat treatment temperature is preferably a temperature of higher than 500° C., and among others, it is more preferably 600° C. or more, even more preferably 700° C. or more, and still more preferably higher than 700° C.

Meanwhile, when the heat treatment temperature is too high, there is a possibility that oxygen deficiency in the spinel structure is rather increased, and a strain of the crystal lattice in the present core particles cannot be recovered even by the heat treatment. Therefore, the heat treatment temperature is preferably a temperature of lower than 850° C., and among others, it is more preferably 820° C. or less, and even more preferably 800° C. or less.

Incidentally, the heat treatment temperature means a product temperature of the treated object which is measured by bringing a thermocouple into contact with the treated object in the furnace.

An example of the preferred conditions in the post-pulverizing heat treatment in an oxygen-containing atmosphere may be a condition in which the overall pressure in the treatment atmosphere is higher than air pressure, the oxygen partial pressure is 0.19 MPa or more, and the temperature is higher than 500° C. and lower than 850° C., among others, 600° C. or more, and still among others, higher than 700° C. or 800° C. or less.

The temperature-rise rate when heating to the heat treatment temperature, that is, the retention temperature is preferably 0.1 to 20° C./min, and among others, it is more preferably 0.25° C./min or more or 10° C./min or less, and even more preferably 0.5° C./min or more or 5° C./min or less.

The retention time of the heat treatment temperature in the post-pulverizing heat treatment step in an oxygen-containing atmosphere is preferably at least one minute or more. This is because oxygen is incorporated into the crystal structure of the present core particles. From such a viewpoint, the retention time of the heat treatment temperature is preferably 5 hours or more, and more preferably 10 hours or more. Further, since an effect of incorporating oxygen into the crystal structure is saturated at a retention time of 50 hours due to heat treatment, it is sufficient with 50 hours or less.

As for the temperature-fall rate after heat treating in an oxygen-containing atmosphere, it is preferable to cool slowly at a cooling rate of 10° C./min or less at least to 500° C., and it is more preferable to control the cooling rate of 0.1 to 8° C./min, and even more preferably 0.2 to 5° C./min.

Since it is considered that the oxygen thus incorporated is stabilized at near 500° C., it can be considered that it is preferable to cool slowly at a temperature-fall rate of 10° C./min or less at least to 500° C.

The heat treatment in the post-pulverizing heat treatment step in an oxygen-containing atmosphere as described above can be performed by heating using an apparatus such as a pressurized furnace at a treatment atmosphere in which an overall pressure in the treatment atmosphere is higher than air pressure, and an oxygen partial pressure in the atmosphere is higher than an oxygen partial pressure in air pressure.

After the post-pulverizing heat treatment step in an oxygen-containing atmosphere, it is preferable to crush the substance as necessary.

In so doing, the crushing is preferably performed to an extent that the primary particles should not be disintegrated.

Then, it is preferable to classify the substance after crushing.

(Coating Treatment)

In order to coat the surface of the present core particle powder thus produced with the present amorphous compound containing Li, the A element, and O, for example, the present core particle powder may be added to a mixed solution obtained by dissolving the lithium raw material and the A element raw material in a solvent, and the resultant product may be hydrolyzed while irradiating ultrasonic waves and then calcined under a predetermined condition.

More specifically, the lithium raw material and the A element raw material, in both of which a ratio between the Li amount and the A element amount is adjusted within a predetermined range, are stirred and dissolved in a solvent, and then the present core particle powder is introduced therein. Next, the resultant product is heated at 20 to 80° C. for 0.5 to 24 hours while irradiating ultrasonic waves to hydrolyze a solution for coating, and the solvent was removed by reducing the pressure to dry the present core particle powder. Next, it is preferable to calcine the resultant dried product at 200 to 400° C. under the air, an oxygen atmosphere, or an inert (nitrogen or argon) atmosphere.

In so doing, the raw material mixing and the hydrolysis are preferably performed under, for example, an atmosphere not containing carbon dioxide, such as a nitrogen atmosphere or an oxygen atmosphere, in order to reduce the amount of lithium carbonate present on the surface of the positive electrode active material.

Examples of the calcination method may include a method using a calcination furnace such as a muffle furnace.

Here, examples of the lithium raw material may include lithium alkoxide, lithium salt, and the like. Specifically, lithium ethoxide ($C_2H_5OLi$) and the like can be used as the lithium raw material. Examples of the A element raw material may include one having OH group at the terminal, one that becomes a hydroxide after being hydrolyzed, and the like. Specifically, pentaethoxy niobium ($Nb(C_2H_5O)_5$) and the like can be used as the A element raw material. The solvent is not especially limited as long as being an organic solvent capable of dissolving the lithium raw material and the A element raw material. For example, ethanol and the like can be cited as the solvent. Meanwhile, the solvent is preferably an anhydrous solvent.

At this time, the ratio between the lithium raw material and the A element raw material is preferably adjusted such that the molar ratio (Li/A) of Li relative to the A element in the surface of the present positive electrode active material, as obtained by XPS, is 1.0 to 3.5.

Further, the calcination is preferably performed under, for example, an atmosphere not containing carbon dioxide, such as a nitrogen atmosphere or an oxygen atmosphere, in order to reduce the amount of lithium carbonate present on the surface of the positive electrode active material.

In addition, when the calcination temperature is 400° C. or less, the compound to be coated on the surface of the present core particles can be made to be amorphous. Thus, from such a viewpoint, the calcination temperature is preferably 200 to 400° C., and among others, it is more preferably 250° C. or more or 400° C. or less, and even more preferably 250° C. or more or 350° C. or less.

<Application of Present Positive Electrode Active Material>

The present positive electrode active material can be suitably used as a positive electrode active material of an all-solid-type lithium secondary battery using a solid electrolyte.

In so doing, the present positive electrode active material alone may be used as a positive electrode active material of an all-solid-type lithium secondary battery, or the present positive electrode active material may be used by mixing with the other positive electrode active material, for example, a positive electrode active material composed of the present core particles or a positive electrode active material composed of the other composition, such as $LiCoO_2$, $LiNiO_2$, $LiMnO_2$, $LiMn_2O_4$, $LiCO_{1/3}Ni_{1/3}Mn_{1/3}O_2$, $LiCo_{0.5}Ni_{0.5}O_2$, $LiNi_{0.7}Co_{0.2}Mn_{0.1}O_2$, $Li(Li_xMn_{2x}Co_{1-3x})O_2$ (where $0<x<1/3$), $LiFePO_4$, or $LiMn_{1-z}M_zPO_4$ (where $0<z\le0.1$ and M represents at least one metal element selected from the group consisting of Co, Ni, Fe, Mg, Zn, and Cu). However, in the case of mixing with the other positive electrode active material, the present positive electrode active material is preferably mixed so as to occupy 50 wt % or more.

Examples of the shape of the all-solid-type lithium secondary battery may include a laminate-type, a cylindrical-type, a square-type, and the like.

For example, an all-solid-type lithium secondary battery can be constituted by forming a layer composed of a solid electrolyte between the positive electrode and the negative electrode. Since the solid electrolyte has excellent moisture resistance, and thus the characteristic degradation is low even by handling in dry air. Therefore, the operation of assembling the all-solid-type lithium secondary battery can be performed even in, for example, a dry room or the like.

Examples of the solid electrolyte may include a compound represented by $Li_{7-x}PS_{6-x}Ha_x$ (Ha is halogen). Among others, a solid electrolyte containing sulfur, for example, a solid electrolyte composed of a compound containing lithium, phosphorus, sulfur, and halogen, and having a cubic argyrodite-type crystal structure, can be cited.

Examples of the negative electrode active material may include a negative electrode active material containing carbon such as artificial graphite, natural graphite, or non-graphitizing carbon (hard carbon). In addition, silicon or tin promising as a high capacity material can also be used as an active material.

<Explanation of Words and Phrases>

In the present specification, in the case of being expressed as "X to Y" (X and Y are arbitrary numbers), it includes the meaning of being "preferably greater than X" or "preferably smaller than Y" together with the meaning of being "X or more and Y or less" unless otherwise stated.

In addition, in the case of being expressed as "X or more" (X is an arbitrary number) or "Y or less" (Y is an arbitrary number), it also includes the intention to be "preferably greater than X" or "preferably less than Y".

EXAMPLES

Next, the present invention will be described further based on Examples and Comparative Examples.

Example 1

(Production of Present Core Particle Powder)

Lithium carbonate having an average particle diameter (D50) of 7 μm, electrolytic manganese dioxide having an average particle diameter (D50) of 23 μm and a specific surface area of 40 m²/g, nickel hydroxide having an average particle diameter (D50) of 22 μm, and titanium oxide having an average particle diameter (D50) of 2 μm were weighed respectively.

A polycarboxylic acid ammonium salt aqueous solution (SN Dispersant 5468, manufactured by San Nopco Ltd.) as a dispersant was added to ion-exchanged water. In so doing, an additive amount of the dispersant was set to 6 wt % relative to the total amount of the Li raw material, the Ni raw material, the Mn raw material, and the Ti raw material. Then, the Ni raw material and the Mn raw material that had been weighed were added to the ion-exchanged water in which the dispersant was dissolved in advance, and the resultant materials were mixed and stirred. Subsequently, the resultant mixture was pulverized by using a wet-type pulverizer at 1,300 rpm for 120 minutes to thereby obtain a pulverized slurry having an average particle diameter (D50) of 0.60 μm or less. Subsequently, all of the Li raw material and the Ti raw material were added to the slurry, and stirred. Further, the slurry was pulverized by using a wet-type pulverizer at 1,300 rpm for 120 minutes to thereby obtain a pulverized slurry having an average particle diameter (D50) of 0.60 μm or less. A solid content concentration at this time was set to 40 wt %.

The pulverized slurry thus obtained was granulated and dried by using a thermal spray drying machine (Spray Dryer "RL-10", manufactured by Ohkawara Kakohki Co., Ltd.). In so doing, a twin-jet nozzle was used for spraying, and the granulation and drying were performed under conditions in which a spray pressure was set to 0.47 MPa, a slurry supply amount was set to 350 ml/min, and a temperature was adjusted such that an outlet temperature of a drying tower became 100 to 110° C.

The obtained granulated powder was calcined by using a stationary electric furnace in an atmosphere having an oxygen partial pressure of 0.021 MPa so as to maintain a temperature of 880° C. for 37 hours, and was then crushed using a crusher (Orient vertical-type pulverizing machine, manufactured by Orient Pulverizing Machine Co., Ltd.). After the crushing, the heat treatment for reducing oxygen deficiency in the spinel structure was performed at 750° C. for 37 hours in an atmosphere having an oxygen partial pressure of 0.021 MPa, and was then crushed with a crusher in the same manner as above.

The calcined powder thus obtained by the heat treatment was classified with a sieve having an aperture of 53 μm, and the powder under the sieve was collected to obtain a spinel-type composite oxide powder.

After the crushing, 1 kg of the obtained spinel-type composite oxide powder was introduced into a plastic beaker (capacity of 5,000 mL) which was filled with ion-exchanged water of 2,000 mL having a pH of 6 to 7 and a temperature of 25° C., and the content was stirred by using a stirrer (propeller area of 33 cm$^2$) at a rotation rate of 400 to 550 rpm for 20 minutes. After the stirring, the stirrer was taken out from the water, and the resultant stirred sample was left to stand for 10 minutes. Then, the supernatant was removed by decantation, the residual was collected as a precipitate by using a suction filtration machine (filter paper No. 131), and the precipitate thus collected was dried in an environment of 120° C. for 12 hours. Thereafter, the resultant product was dried for 7 hours in a state of being heated so as to have the product temperature of 500° C.

Then, the resultant dried product was pulverized by using a counter jet mill (pulverizing and classifying apparatus, manufactured by Hosokawa Micron Corp) (pulverizing condition: rotation rate of classifier of 13,000 rpm), and was subjected to a heat treatment at 730° C. for 5 hours while allowing oxygen to flow at an oxygen supply amount of 0.5 L/min in a tubular furnace (manufactured by Koyo Thermo Systems Co., Ltd.). Thereafter, the resultant heat-treated product was classified with a sieve having an aperture of 300 μm to thereby obtain a spinel-type composite oxide powder, that is, the present core particle powder.

Chemical analysis was performed with respect to the spinel-type composite oxide powder, and as a result, the components were Li: 4.1 wt %, Ni: 13.3 wt %, Mn: 40.8 wt %, and Ti: 5.2 wt %. In other words, the composition of the spinel-type composite oxide powder as expressed by a compositional formula was Li [Li$_{0.07}$Mn$_{1.33}$Ni$_{0.41}$Ti$_{0.19}$]O$_{4-\delta}$, and the M1 element corresponded to Ni and the M2 element corresponded to Ti.

(Production of Positive Electrode Active Material)

A sol-gel solution for coating (lithium amount of 1.5 mmol and niobium amount of 0.75 mmol) was prepared by, when Nb was used as the A element, adjusting the amounts of lithium ethoxide and pentaethoxy niobium and adding these to ethanol to be dissolved such that the molar ratio (Li/Nb) of the Li amount relative to the Nb amount became 2.0. 5 g of the spinel-type composite oxide powder (present core particle powder) was introduced in the sol-gel solution for coating. The resultant product was heated at 60° C. for 30 minutes and hydrolyzed while irradiating ultrasonic waves by using a rotatory evaporator, and the solvent was removed by reducing the pressure for 30 minutes while maintaining a temperature of 60° C. Thereafter, the resultant product was left to stand for 16 hours at room temperature. Next, the resultant product was calcined by using a NHK-170 that was a desktop small-sized electric furnace manufactured by Nitto Kagaku Co., Ltd. so as to maintain a temperature of 350° C. for 5 hours under the air atmosphere, thereby obtaining a positive electrode active material (sample).

Examples 2 and 3, and Comparative Examples 1 and 2

A positive electrode active material (sample) was obtained in the same manner as in Example 1 except that the amounts of lithium ethoxide and pentaethoxy niobium were changed as shown in Table 1 or 2.

Comparative Example 3

A positive electrode active material (sample) was obtained in the same manner as in Example 1 except that the amounts of lithium ethoxide and pentaethoxy niobium were changed as shown in Table 2, and the calcination time was changed from 350° C. to 700° C.

Examples 4 and 5

A positive electrode active material (sample) was obtained in the same manner as in Example 1 except that the amounts of lithium ethoxide and pentaethoxy niobium were changed as shown in Table 1.

Examples 6 and 7

A positive electrode active material (sample) was obtained in the same manner as in Example 1 except that the amounts of lithium ethoxide and pentaethoxy niobium were changed as shown in Table 3, and pentaethoxy tantalum (Ta(OC$_2$H$_5$)$_5$) was added.

Example 8

A positive electrode active material (sample) was obtained in the same manner as in Example 1 except that the amounts of lithium ethoxide and pentaethoxy niobium were changed as shown in Table 4, and tetra-i-propoxytitanium (Ti(O-i-C$_3$H$_7$)$_4$) was added.

Comparative Example 4

A core particle powder was produced in the same manner as in Example 1, and it was used as a positive electrode active material (sample). In other words, a coating treatment, in which the core particle powder was treated by introducing into a sol-gel solution for coating in the same manner as in Example 1, was not performed, and the core particle powder was used as a positive electrode active material (sample).

Comparative Example 5

A positive electrode active material (sample) was obtained in the same manner as in Example 1 except that the amounts of lithium ethoxide and pentaethoxy niobium were changed as shown in Table 2, and lithium acetate (anhydrous) (CH$_3$COOLi) was added as a lithium source.

<Surface Analysis by XPS>

The particle surface of the positive electrode active material (sample) obtained in each of Examples and Comparative Examples was analyzed by using a QUANTUM 2000 that was an XPS apparatus manufactured by Ulvac-Phi, Inc. The conditions and the like used for the analysis were as follows.

Excited X-ray: monomer Al-Kα ray (1,486.6 eV)
Output: 100 W
Acceleration voltage: 15 kV
X-ray irradiation diameter: 100 μmφ
Measurement area: 100 μmφ×1 mm
Pass energy: 23.5 eV
Energy step: 0.1 eV The analysis of the XPS data was performed by using data analysis software ("Multipack Ver. 9.0", manufactured by Ulvac-Phi, Inc.). Iterated Shirley was used as a background mode.

The analysis was performed by taking the interferences of the Ni LMM peak and Mn LMM peak into consideration, and the orbit to be used for the calculation was determined for each element as described below.

Li: 1s
Ni: 2p1
Nb: 3d

Mn: 2p1
Ti: 2p3
C: 1s
O: 1s

More specifically, in regard to the positive electrode active material (sample) obtained in each of Examples and Comparative Examples, the surface of the positive electrode active material particles was analyzed under the aforementioned conditions by using XPS, and the ratio (Li/Nb) of the peak intensity of Li relative to the peak intensity of Nb was determined from the obtained X-ray photoelectron spectroscopic spectrum.

Meanwhile, by using XPS, the elemental component in the depth to about 9.5 nm (in terms of $LiNbO_3$) from the particle surface can be quantitatively analyzed.

<Observation of Halo Pattern by Selected Area Electron Diffraction>

An electron diffraction was acquired from a range of about 100 nm in diameter under the conditions of an acceleration voltage of 200 kV and a selected area aperture size of 10 μm by using a transmission electron microscope (JEM-ARM200F, manufactured by JEOL Ltd.) to thereby observe the presence or absence of a halo pattern as shown in FIG. 3.

When the halo pattern can be observed, it can be confirmed that the compound present on the surface of the positive electrode active material (sample) obtained in each of Examples and Comparative Examples is an amorphous compound.

Meanwhile, the scale bar shown in FIG. 3 is a scale bar in the reciprocal lattice space.

<Analysis of Lithium Carbonate Amount>

0.48 g of the positive electrode active material (sample) obtained in each of Examples and Comparative Examples was introduced into 48 ml of pure water and stirred for 5 minutes, and the resultant liquid was then filtered. The liquid that extracted lithium carbonate as described above was measured by ion chromatography, and $CO_3^{2-}$ was quantitated to determine the amount of lithium carbonate.

Meanwhile, the measurement was performed at 35° C. by using a Dionex ICS-2000 manufactured by Thermo Fisher Scientific K.K. as a measurement apparatus, a Dionex Ion-Pac AS17-C as a column, and a potassium hydroxide as a carrier liquid (eluent).

The ratio (wt %) of the amount of lithium carbonate relative to the positive electrode active material (sample) was shown in Table 1.

<Production and Evaluation of all-Solid-Type Lithium Secondary Battery>

A positive electrode mixture was prepared by using the sample obtained in each of Examples and Comparative Examples and a solid electrolyte to produce an all-solid-type lithium secondary battery (all-solid Gr/5 V-class positive electrode active material cell), and then the battery characteristics (evaluations of rate characteristics and cycle characteristics) were evaluated.

(Material)

The sample obtained in each of Examples and Comparative Examples was used as a positive electrode active material, a graphite (Gr) powder was used as a negative electrode active material, and a powder represented by a compositional formula: $Li_{5.8}PS_{4.8}Cl_{1.2}$ was used as a solid electrolyte powder.

The positive electrode mixture powder was prepared by mixing the positive electrode active material (sample), the solid electrolyte powder, and a conductive assistant (acetylene black) powder in a ratio of 60:30:10 by using a ball mill.

(Production of all-Solid-Type Lithium Secondary Battery)

13 mg of the positive electrode mixture powder (sample) was filled in an insulated tube (09 mm) for sealed-type cell, and was uniaxially molded at 500 MPa to produce a positive electrode mixture powder pellet. The obtained positive electrode pellet was moved into an insulated tube (010.5 mm) for sealed-type cell, and 100 mg of the solid electrolyte powder was filled onto the positive electrode pellet. Next, the solid electrolyte powder was uniaxially molded along with the positive electrode mixture pellet at 184 MPa. Thereafter, 10 mg of the graphite (Gr) powder was filled onto the solid electrolyte, and was uniaxially molded at 551 MPa. Then, they were fastened with pressuring screws to produce an all-solid-type lithium secondary battery.

(Evaluation of Battery Characteristics)

The battery characteristics were evaluated after introducing the all-solid-type lithium secondary battery into an environmental tester maintained at 25° C., and connecting with a charge-discharge measurement apparatus. At this time, the charging was performed in a CC-CV mode at the upper limit voltage of 5.0 V, and the discharging was performed in a CC mode at the lower limit voltage of 3.0 V.

The charging and the discharging were repeated at the current density of 0.1 C for the first cycle to the third cycle. At the 4th cycle, the charging was performed at the current density of 0.2 C, and the discharging was performed at the current density of 2.0 C. Then, for the 5th cycle to the 51st cycle, the charging and the discharging were repeated at the current density of 0.1 C.

The rate characteristics were expressed by a quotient obtained by dividing a discharge capacity of the 4th cycle by a discharge capacity of the second cycle, and the cycle characteristics were expressed by a quotient obtained by dividing a discharge capacity of the 51st cycle by a discharge capacity of the second cycle.

The results were shown in Tables 1 to 4.

TABLE 1

|  | Unit | Example 1 | Example 2 | Example 3 | Example 4 | Example 5 |
|---|---|---|---|---|---|---|
| Sol-gel raw material elements | — | Li, Nb | Li, Nb | Li, Nb | Li, Nb | Li, Nb |
| Li/Nb of raw materials | — | 2 | 4 | 6 | 1.2 | 1.33 |
| Amount of lithium ethoxide | mmol | 1.5 | 3 | 4.5 | 3.6 | 1 |
| Amount of pentaethoxy niobium | mmol | 0.75 | 0.75 | 0.75 | 3 | 0.75 |
| Lithium acetate | mmol | — | — | — | — | — |
| Calcination temperature | ° C. | 350 | 350 | 350 | 350 | 350 |
| Li/Nb (analysis by XPS) | — | 1.58 | 2.01 | 2.88 | 1.1 | 1.2 |
| Presence or absence of halo pattern (analysis by TEM) | — | Presence | Presence | Presence | Presence | Presence |
| Amount of $Li_2CO_3$ | % | 0.11 | 0.44 | 1.82 | 0.23 | 0.12 |
| Rate characteristics: 2 C/0.1 C capacity retention rate @ 25° C. | % | 58 | 79 | 50 | 53 | 56 |

TABLE 1-continued

|  | Unit | Example 1 | Example 2 | Example 3 | Example 4 | Example 5 |
|---|---|---|---|---|---|---|
| Cycle characteristics: 50 cycles capacity retention rate @ 25° C. | % | 88 | 95 | 68 | 83 | 84 |

TABLE 2

|  | Unit | Comparative Example 1 | Comparative Example 2 | Comparative Example 3 | Comparative Example 4 | Comparative Example 5 |
|---|---|---|---|---|---|---|
| Sol-gel raw material elements | — | Li, Nb | Li, Nb | Li, Nb | — | Li, Nb |
| Li/Nb of raw materials | — | 1 | 8 | 1 | — | 4.48 |
| Amount of lithium ethoxide | mmol | 0.75 | 6 | 3 | — | 3 |
| Amount of pentaethoxy niobium | mmol | 0.75 | 0.75 | 3 | — | 3 |
| Lithium acetate | mmol | — | — | — | — | 10.45 |
| Calcination temperature | ° C. | 350 | 350 | 700 | — | 350 |
| Li/Nb (analysis by XPS) | — | 0.79 | 3.79 | 1.47 | — | 3.8 |
| Presence or absence of halo pattern (analysis by TEM) | — | Presence | Presence | Absence | Absence | Presence |
| Amount of $Li_2CO_3$ | % | 0.05 | 3.44 | 0.01 | 0.01 | 0.92 |
| Rate characteristics: 2 C/0.1 C capacity retention rate @ 25° C. | % | 0 | 0 | 1 | 0 | 0 |
| Cycle characteristics: 50 cycles capacity retention rate @ 25° C. | % | 59 | 50 | 0 | 0 | 0 |

TABLE 3

|  | Unit | Example 6 | Example 7 |
|---|---|---|---|
| Sol-gel raw material elements | — | Li, Nb, Ta | Li, Nb, Ta |
| Li/(Nb + Ta) of raw materials | — | 4 | 2 |
| Amount of lithium ethoxide | mmol | 3 | 3 |
| Amount of pentaethoxy niobium | mmol | 0.375 | 1 |
| Amount of pentaethoxy tantalum | mmol | 0.375 | 0.5 |
| Calcination temperature | ° C. | 350 | 350 |
| Li/(Nb + Ta) (analysis by XPS) | — | 3.3 | 1.5 |
| Presence or absence of halo pattern (analysis by TEM) | — | Presence | Presence |
| Amount of $Li_2CO_3$ | % | 1.48 | 0.54 |
| Rate characteristics: 2 C/0.1 C capacity retention rate @ 25° C. | % | 61 | 13 |
| Cycle characteristics: 50 cycles capacity retention rate @ 25° C. | % | 93 | 74 |

TABLE 4

|  | Unit | Example 8 |
|---|---|---|
| Sol-gel raw material elements | — | Li, Nb, Ti |
| Li/(Nb + Ti) of raw materials | — | 2 |
| Amount of lithium ethoxide | mmol | 3 |
| Amount of pentaethoxy niobium | mmol | 1.4 |
| Amount of tetrapropoxy-i-titanium | mmol | 0.1 |
| Calcination temperature | ° C. | 350 |
| Li/(Nb + Ti) (analysis by XPS) | — | 2.4 |
| Presence or absence of halo pattern (analysis by TEM) | — | Presence |
| Amount of $Li_2CO_3$ | % | 0.16 |
| Rate characteristics: 2 C/0.1 C capacity retention rate @ 25° C. | % | 14 |
| Cycle characteristics: 50 cycles capacity retention rate @ 25° C. | % | 72 |

(Consideration)

In Comparative Example 1, the atomic amount ratio (Li/A) of Li relative to the A element in the surface of the present positive electrode active material, as obtained by XPS, was too low, and thus the rate characteristics and the cycle characteristics were inferior as compared with those of Examples 1 to 8.

Conversely, in Comparative Examples 2 and 5, the atomic amount ratio (Li/A) of Li relative to the A element in the surface of the present positive electrode active material was too high, and thus the rate characteristics and the cycle characteristics were inferior as compared with those of Examples 1 to 8.

In Comparative Example 3, since the calcination temperature was too high, the compound present on the particle surface was crystalline, and thus the rate characteristics and the cycle characteristics were inferior.

In Comparative Example 4, since the surface of the core particles was not coated with the amorphous compound, the rate characteristics and the cycle characteristics were inferior as compared with those of Examples 1 to 8.

Considering the results of Examples and Comparative Examples as described above and the results of the tests which have been so far conducted by the inventors, in regard to the positive electrode active material comprising a structure in which the surface of the present core particles composed of a spinel-type composite oxide containing Li, Mn, O, and two or more other elements is coated with the amorphous compound containing Li, A (A represents one or more elements selected from the group consisting of Ti, Zr, Ta, Nb, and Al), and O, when the molar ratio (Li/A) of Li relative to the A element in the surface, as obtained by XPS, is 1.0 to 3.5, the rate characteristics and the cycle characteristics can be effectively improved. It can be considered that the above results can be obtained by achieving both the improvement of lithium ionic conductivity and the resistance suppression.

Meanwhile, the aforementioned Examples provide only the present core particles each having a specific composition. However, as disclosed in Japanese Patent Laid-Open No. 2014-130851, compounds having a composition represented by a general formula: Li $[Li_aMn_{2-a-b-c}M1_bM2_c]O_{4-\delta}$ (where M1 represents an element selected from the group consisting of Ni, Co, and Fe; M2 represents an element selected from the group consisting of Mg, Ti, Al, Ba, Cr, W, Mo, Y, Zr, and Nb; and the parameters a, b, and c satisfy $0.00 \leq a \leq 0.20$, $0.20 \leq b \leq 1.20$, and $0.001 \leq c \leq 0.400$ respectively) have a common property and feature, and thus it can be considered that the compounds having the aforementioned composition can exhibit the same property and feature as those of the present core particles each having a specific composition that are used in Examples.

The invention claimed is:

1. A positive electrode active material for an all-solid-type lithium secondary battery to be used for an all-solid-type lithium secondary battery,
wherein the surface of particles (referred to as "core particles") composed of a spinel-type composite oxide containing Li, Mn, O, and two or more other elements is coated with an amorphous compound containing Li, A (A represents one or more elements selected from the group consisting of Ti, Zr, Ta, Nb, and Al), and O; and
the molar ratio (Li/A) of Li relative to the A element in the surface, as obtained by X-ray photoelectron spectroscopy (XPS), is 1.0 to 3.5.

2. The positive electrode active material for an all-solid-type lithium secondary battery according to claim 1,
wherein, in the amorphous compound, a halo pattern can be obtained by selected area electron diffraction.

3. The positive electrode active material for an all-solid-type lithium secondary battery according to claim 2,
wherein an amount of lithium carbonate present on the surface of the positive electrode active material is less than 2.5 wt % relative to the amount of the positive electrode active material.

4. The positive electrode active material for an all-solid-type lithium secondary battery according to claim 3,
wherein the spinel-type composite oxide constituting the core particles is represented by a general formula: $Li[Li_aMn_{2-a-b-c}M1_bM2_c]O_{4-\delta}$ (where M1 represents one or more elements selected from the group consisting of Ni, Co, and Fe; M2 represents one or more elements selected from the group consisting of Mg, Ti, Al, Ba, Cr, W, Mo, Y, Zr, and Nb; and the parameters a, b, and c satisfy $0.00 \leq a \leq 0.20$, $0.20 \leq b \leq 1.20$, and $0.001 \leq c \leq 0.400$ respectively).

5. An all-solid-type lithium secondary battery comprising the positive electrode active material for an all-solid-type lithium secondary battery according claim 3.

6. The positive electrode active material for an all-solid-type lithium secondary battery according to claim 2,
wherein the spinel-type composite oxide constituting the core particles is represented by a general formula: $Li[Li_aMn_{2-a-b-c}M1_bM2_c]O_{4-\delta}$ (where M1 represents one or more elements selected from the group consisting of Ni, Co, and Fe; M2 represents one or more elements selected from the group consisting of Mg, Ti, Al, Ba, Cr, W, Mo, Y, Zr, and Nb; and the parameters a, b, and c satisfy $0.00 \leq a \leq 0.20$, $0.20 \leq b \leq 1.20$, and $0.001 \leq c \leq 0.400$ respectively).

7. An all-solid-type lithium secondary battery comprising the positive electrode active material for an all-solid-type lithium secondary battery according claim 2.

8. The positive electrode active material for an all-solid-type lithium secondary battery according to claim 1,
wherein an amount of lithium carbonate present on the surface of the positive electrode active material is less than 2.5 wt % relative to the amount of the positive electrode active material.

9. The positive electrode active material for an all-solid-type lithium secondary battery according to claim 8,
wherein the spinel-type composite oxide constituting the core particles is represented by a general formula: $Li[Li_aMn_{2-a-b-c}M1_bM2_c]O_{4-\delta}$ (where M1 represents one or more elements selected from the group consisting of Ni, Co, and Fe; M2 represents one or more elements selected from the group consisting of Mg, Ti, Al, Ba, Cr, W, Mo, Y, Zr, and Nb; and the parameters a, b, and c satisfy $0.00 \leq a \leq 0.20$, $0.20 \leq b \leq 1.20$, and $0.001 \leq c \leq 0.400$ respectively).

10. An all-solid-type lithium secondary battery comprising the positive electrode active material for an all-solid-type lithium secondary battery according claim 8.

11. The positive electrode active material for an all-solid-type lithium secondary battery according to claim 1,
wherein the spinel-type composite oxide constituting the core particles is represented by a general formula: $Li[Li_aMn_{2-a-b-c}M1_bM2_c]O_{4-\delta}$ (where M1 represents one or more elements selected from the group consisting of Ni, Co, and Fe; M2 represents one or more elements selected from the group consisting of Mg, Ti, Al, Ba, Cr, W, Mo, Y, Zr, and Nb; and the parameters a, b, and c satisfy $0.00 \leq a \leq 0.20$, $0.20 \leq b \leq 1.20$, and $0.001 \leq c \leq 0.400$ respectively).

12. An all-solid-type lithium secondary battery comprising the positive electrode active material for an all-solid-type lithium secondary battery according claim 11.

13. An all-solid-type lithium secondary battery comprising the positive electrode active material for an all-solid-type lithium secondary battery according claim 1.

* * * * *